United States Patent
Li

(10) Patent No.: US 11,376,806 B2
(45) Date of Patent: Jul. 5, 2022

(54) PRODUCTION PROCESS OF INSOLE

(71) Applicant: Zhongshan Cheng Shing Plastic Co., Ltd., Zhongshan (CN)

(72) Inventor: Yunshun Li, Zhongshan (CN)

(73) Assignee: Zhongshan Cheng Shing Plastic Co., Ltd., Zhongshan (CN)

( * ) Notice: Subject to any disclaimer, the term of this patent is extended or adjusted under 35 U.S.C. 154(b) by 292 days.

(21) Appl. No.: 16/595,070

(22) Filed: Oct. 7, 2019

(65) Prior Publication Data
US 2020/0198277 A1    Jun. 25, 2020

(30) Foreign Application Priority Data
Dec. 21, 2018   (CN) .......................... 201811570615.2

(51) Int. Cl.
| | |
|---|---|
| *B29D 35/10* | (2010.01) |
| *B29D 35/12* | (2010.01) |
| *B29D 35/06* | (2010.01) |

(52) U.S. Cl.
CPC ......... *B29D 35/122* (2013.01); *B29D 35/061* (2013.01); *B29D 35/128* (2013.01); *B29D 35/10* (2013.01)

(58) Field of Classification Search
CPC .................. B29D 35/061; B29L 2031/507
See application file for complete search history.

(56) References Cited

U.S. PATENT DOCUMENTS

| | | | | |
|---|---|---|---|---|
| 3,628,996 | A | * 12/1971 | Weber ................. | C08L 83/04 427/387 |
| 2013/0291409 | A1 | * 11/2013 | Reinhardt ........... | A43B 17/006 36/30 R |
| 2019/0073709 | A1 | * 3/2019 | Hayes ................. | B29D 35/122 |
| 2019/0352446 | A1 | * 11/2019 | Vontorcik, Jr. ..... | B29C 45/0001 |

FOREIGN PATENT DOCUMENTS

| | | | | |
|---|---|---|---|---|
| CN | 1827351 | * | 9/2006 | ............. B29C 44/02 |
| CN | 106273184 | * | 1/2017 | ............. B29C 44/04 |
| JP | WO2013121851 | * | 8/2013 | ............... B22C 3/00 |

OTHER PUBLICATIONS

Liu CN 1827351 English Translation 2006 (Year: 2006).*
Kojima WO2013121851 English Translation 2013 (Year: 2013).*
Wu CN 106273184 English Translation 2017 (Year: 2017).*

* cited by examiner

*Primary Examiner* — Jacob T Minskey
*Assistant Examiner* — Adrien J Bernard
(74) *Attorney, Agent, or Firm* — Bay State IP, LLC

(57) ABSTRACT

A production process of an insole, the steps of: cleaning an insole mold; spraying an oily release agent into a cavity of an upper mold and a cavity of a lower mold of the mold; uniformly fixing cloth in the cavity of the upper mold; injecting shoe material into the cavity of the lower mold of the mold, covering the upper mold of the mold to lock the upper mold and the lower mold after finishing injecting shoe material, and then placing the mold in an oven for baking, opening the upper mold of the mold after finishing baking, and taking out the insole. The production process of an insole is simple in process and high in yield rate, and uses the characteristics that the cloth and the raw material have good adhesion to directly put the cloth into the mold to take shape, thereby eliminating a glue adhesion process.

9 Claims, No Drawings

PRODUCTION PROCESS OF INSOLE

CROSS REFERENCE TO RELATED APPLICATION

This application takes priority from and claims the benefit of Chinese Patent Application No. 201811570615.2 filed on Dec. 21, 2018, the contents of which are herein incorporated by reference.

BACKGROUND OF THE INVENTION

Field of the Invention

The present invention relates to the field of production technology, and in particular to a production process of an insole.

Description of the Related Art

As the living standards of people continue to improve, the requirements for comfort are constantly increasing. For example, for shoes, in order to make the shoes more fit or more comfortable, people usually put insoles in the shoes and increase the comfort of the human foot by putting insoles in the shoes. At present, insoles are mostly produced by other materials. The produced insoles are poor in elasticity and not high in comfort. The material of the product has odor and is not easy to degrade. In order to make the insole beautiful, cloth or leather of different colors and different patterns is usually pasted on the insole using glues.

SUMMARY OF THE INVENTION

It is an object of the present invention to provide an insole which is highly molded by a mold and is high in comfort without glues for adhesion, beautiful in appearance and high in yield rate.

A production process of an insole, comprising the steps of:

(1) cleaning an insole mold; cleaning the flash on the edge of the mold with a scraper knife, and then blowing the foreign matter in the mold with a blower gun to prevent foreign matter in the mold from affecting the quality of the product;

(2) spraying an oily release agent into a cavity of an upper mold and a cavity of a lower mold of the mold; spraying the oily release agent with a spray gun, adjusting the spray gun into an atomizing shape when spraying the oily release agent with a spray gun, uniformly spraying a proper amount of oily release agent along the shape of the mold, and spraying the oily release agent at every corner of the mold;

(3) uniformly fixing cloth in the cavity of the upper mold; putting the cloth with a corresponding yardage according to the yardage of the mold and hanging the cloth on the corresponding nail position on the mold from top to bottom, and checking whether the cloth is flat after hanging the cloth, wherein if the cloth is not flat, the cloth will wrinkle after the mold is clamped, which will affect the quality of the finished product; therefore, the flatness of the cloth should be ensured; the mold according to the present invention is provided with a nail position; and the cloth is provided with a hole position corresponding to the nail position, so that it is not necessary to force the cloth into the nail position when hanging the cloth, avoiding affecting the quality of the product, and it is not easy to hurt workers.

(4) injecting shoe material into the cavity of the lower mold of the mold, covering the upper mold of the mold and locking the upper mold and the lower mold after finishing injecting shoe material, and then placing the mold in an oven for baking to emulsify and foam the shoe material, opening the upper mold of the mold after finishing emulsifying and foaming, and taking out the insole.

Further, in the step (2), the oily release agent and quick-drying water are mixed and stirred uniformly and then are sprayed; the oily release agent and the quick-drying water have a weight ratio of 18-22:100.

Further, in the step (2), the oily release agent is sprayed at a distance of 15-20 cm from the mold by a spray gun so that the cavities of the upper mold and the lower mold are uniformly coated with the oily release agent having a thickness of 0.05-0.1 mm. The release agent is sprayed thinly, so that it is relatively easy for the solvent in the release agent to dry. If the oily release agent is sprayed too thickly, the solvent is not volatile, and it is not easy for the release agent to dry, which will damage the product and cause the surface of the product to be rotten.

Further, in the step (4), the sole of the mold is raised by 4-8 cm, and the shoe material is injected into the cavity of the lower mold. Raising the sole of the mold will help to uniformly feed the material.

Further, in the step (4), the injected shoe material is taken from the middle of the cavity of the lower mold of the mold, and is fed to the sole along the middle of the cavity of the lower mold of the mold until the top of the cavity.

Further, in the step (4), the amount of the injected shoe material accounts for ⅓-½ of the total volume of the mold cavity. Since the injected shoe material is foamed material, it is not necessary for the cavity to be full of the shoe material, and the injected foamed shoe material will be foamed and filled into the cavity.

Further, in the step (4), the mold is fed into an oven at a temperature of 75-80° C. for 5-6 minutes.

Further, the oily release agent comprises the following raw material in parts by weight: 88-92 parts of silicone resin, 6-10 parts of polydimethylsiloxane, and 1-3 parts of phenyl alkyl sulfonate.

Further, the shoe material comprises material A and material B;

the material A comprises the following raw material in parts by weight: 68-72 parts of castor oil, 23-26 parts of polyethylene glycol ether, 1.2-1.6 parts of solid acid catalyst, 0.9-1.0 parts of tertiary amine catalyst, 0.03-0.05 parts of gel catalyst, 0.8-1.2 parts of foam stabilizer, 1.3-1.6 parts of vinyl silicone oil, 1-1.2 parts of ammonia catalyst and 0.4-0.6 parts of water;

the material B comprises the following raw material in parts by weight: 68-72 parts of diphenylmethane diisocyanate, 22-26 parts of polyether, and 4-8 parts of diargonized carbon.

The material A is injected into A material cylinder after being mixed and stirred uniformly; the material B is injected into B material cylinder after being mixed and stirred uniformly; pipeline A is connected to the A material cylinder, pipeline B is connected to the B material cylinder, the material A and the material B are introduced into a stirring chamber of a filling machine head at the same time from the two material cylinders using the pipeline A and the pipeline B under the action of a pressure pump, respectively, uniformly stirred for 0.1-0.3 s using a stirring blade rotating at a high speed in the stirring chamber, and then injected rapidly into the cavity of the mold from the discharging port of the filling machine. Since the emulsification reaction time of the material A and the material B is generally about 8-9 seconds, and the total time from the mixing and stirring of the two raw materials into the stirring chamber to the discharge from the discharging port is less than 1 second, the material A and the material B will not result in emulsification reaction in the whole stirring process.

The addition of polyethylene glycol ether can make the product have the advantages of low dosage, high reduction rate, good reinforcing effect, durability and environmental friendliness.

The solid acid catalyst is an important class of catalysts in acid-base catalysts. The catalytic function is derived from the catalytically active acidic sites present on the solid surface.

The tertiary amine catalyst may be a tertiary amine catalyst, N,N-dimethylbutylamine, N,N-dimethylbutylamine, etc.

The foam stabilizer is a surfactant, which is capable of increasing the solubility of each component and has the function of stabilizing foam and regulating cells. During the formation of foam, the precipitation of insoluble polyurea will destroy the stability of foam, and the important role of the foam stabilizer is to disperse polyurea and increase the compatibility of polyurea with foam matrix. The foam stabilizer used currently is mostly a polyether modified silicone surfactant, and its main structure is a polysilane-oxyalkylene block copolymer.

Further, the weight ratio of the material A to the material B is 100:58-60.

The present invention has the beneficial effects that the production process of an insole according to the present invention is simple in process and high in yield rate, and uses the characteristics that the cloth and the raw material have good adhesion to directly put the cloth into the mold to take shape, thereby eliminating a glue adhesion process and improving production efficiency. Moreover, insole material used in the production process of an insole according to the present invention is renewable raw material, which is easily degraded, pollution-free to the environment, and recyclable; the material is good in flexibility, excellent in mechanical stress performance, and high in comfort; and the insole is good in thermal stability, water resistant, acid resistant, and solvent resistant.

DETAILED DESCRIPTION OF THE SEVERAL EMBODIMENTS

Embodiment 1

A production process of an insole comprises the steps of:
(1) cleaning an insole mold; cleaning the flash on the edge of the mold with a scraper knife, and then blowing the foreign matter in the mold with a blower gun to prevent foreign matter in the mold from affecting the quality of the product;
(2) spraying an oily release agent into a cavity of an upper mold and a cavity of a lower mold of the mold; spraying the oily release agent with a spray gun, adjusting the spray gun into an atomizing shape when spraying the oily release agent with a spray gun, uniformly spraying a proper amount of oily release agent along the shape of the mold, and spraying the oily release agent at every corner of the mold;
(3) uniformly fixing cloth in the cavity of the upper mold; putting the cloth with a corresponding yardage according to the yardage of the mold and hanging the cloth on the corresponding nail position on the mold from top to bottom, and checking whether the cloth is flat after hanging the cloth, wherein if the cloth is not flat, the cloth will wrinkle after the mold is clamped, which will affect the quality of the finished product; therefore, the flatness of the cloth should be ensured; the mold according to the present invention is provided with a nail position; and the cloth is provided with a hole position corresponding to the nail position, so that it is not necessary to force the cloth into the nail position when hanging the cloth, avoiding affecting the quality of the product, and it is not easy to hurt workers.
(4) injecting shoe material into the cavity of the lower mold of the mold, covering the upper mold of the mold and locking the upper mold and the lower mold after finishing injecting shoe material, and then placing the mold in an oven for baking to emulsify and foam the shoe material, opening the upper mold of the mold after finishing foaming, and taking out the insole.

Embodiment 2

A production process of an insole comprises the steps of:
(1) cleaning an insole mold; cleaning the flash on the edge of the mold with a scraper knife, and then blowing the foreign matter in the mold with a blower gun to prevent foreign matter in the mold from affecting the quality of the product;
(2) mixing and stirring the oily release agent and quick-drying water uniformly at a weight ratio of 18:100, then spraying the oily release agent at a distance of 15 cm from the mold by a spray gun into the cavity of the upper mold and the cavity of the lower mold of the mold, adjusting the spray gun into an atomizing shape when spraying the oily release agent, spraying along the shape of the cavity, spraying at every corner, forming an oily release agent having a thickness of 0.05 mm in the cavity after finishing spraying; wherein the oily release agent cannot be sprayed too thickly when being sprayed, and if the oily release agent is sprayed too thickly, the solvent is not volatile, and it is not easy for the release agent to dry, which will damage the product;

As a preferred embodiment, the oily release agent comprises the following raw material in parts by weight: 88 kg of silicone resin, 6 kg of polydimethylsiloxane, and 1 kg of phenyl alkyl sulfonate.
(3) uniformly fixing cloth in the cavity of the upper mold after the oily release agent is sprayed; putting the cloth with a corresponding yardage according to the yardage of the mold and hanging the cloth on the corresponding nail position on the mold from top to bottom, and checking whether the cloth is flat after hanging the cloth, wherein if the cloth is not flat, the cloth is adjusted, and since the cloth will wrinkle due to being not flat after the mold is clamped, which will affect the quality of the finished product, the flatness of the cloth should be ensured;
(4) injecting material A into A material cylinder after being mixed and stirred uniformly; injecting the material B into B material cylinder after being mixed and stirred uniformly; connecting pipeline A to the A material cylinder, connecting pipeline B to the B material cylinder, introducing the material A and the material B into a stirring chamber of a filling machine head at the same time from the two material cylinders using the pipeline A and the pipeline B under the action of a pressure pump, respectively, uniformly stirring the material for 0.1 s using a stirring blade rotating at a high speed in the stirring chamber, and then injecting the material rapidly into the cavity of the lower mold of the mold from the discharging port of the filling machine. In order to feed uniformly, the sole of the mold is raised by 4 cm prior to injecting the shoe material, and the shoe material is taken from the middle of the cavity of the lower mold of the mold when being injected, and is fed to the sole along the middle of the cavity of the lower mold of the mold until the top of the cavity of the mold; the amount of the injected shoe material accounts for ⅓ of the total volume of the mold cavity, and the injected shoe material is foamed in such a way to be filled into the whole cavity to form the insole; after finishing injecting shoe material, the mold is placed in an oven at a temperature of 75° C. for 5 minutes to emulsify and foam the shoe material, the upper mold of the mold is opened after finishing emulsifying and foaming, and the insole is taken out.

As a preferred embodiment, the material A comprises the following raw material in parts by weight: 68 kg of castor oil, 23 kg of polyethylene glycol ether, 1.2 kg of solid acid catalyst, 0.9 kg of tertiary amine catalyst, 0.03 kg of gel catalyst, 0.8 kg of foam stabilizer, 1.3 kg of vinyl silicone oil, 1 kg of ammonia catalyst and 0.4 kg of water; the material B comprises the following raw material in parts by weight: 68 kg of diphenylmethane diisocyanate, 22 kg of polyether, and 4 kg of diargonized carbon; and the weight ratio of the material A to the material B is 100:58.

Embodiment 3

A production process of an insole comprises the steps of:

(1) cleaning an insole mold; cleaning the flash on the edge of the mold with a scraper knife, and then blowing the foreign matter in the mold with a blower gun to prevent foreign matter in the mold from affecting the quality of the product;

(2) mixing and stirring the oily release agent and quick-drying water uniformly at a weight ratio of 20:100, then spraying the oily release agent at a distance of 18 cm from the mold by a spray gun into the cavity of the upper mold and the cavity of the lower mold of the mold, adjusting the spray gun into an atomizing shape when spraying the oily release agent, spraying along the shape of the cavity, spraying at every corner, forming an oily release agent having a thickness of 0.08 mm in the cavity after finishing spraying; wherein the oily release agent cannot be sprayed too thickly when being sprayed, and if the oily release agent is sprayed too thickly, the solvent is not volatile, and it is not easy for the release agent to dry, which will damage the product;

As a preferred embodiment, the oily release agent comprises the following raw material in parts by weight: 90 kg of silicone resin, 8 kg of polydimethylsiloxane, and 2 kg of phenyl alkyl sulfonate.

(3) uniformly fixing cloth in the cavity of the upper mold after the oily release agent is sprayed; putting the cloth with a corresponding yardage according to the yardage of the mold and hanging the cloth on the corresponding nail position on the mold from top to bottom, and checking whether the cloth is flat after hanging the cloth, wherein if the cloth is not flat, the cloth is adjusted, and since the cloth will wrinkle due to being not flat after the mold is clamped, which will affect the quality of the finished product, the flatness of the cloth should be ensured;

(4) injecting material A into A material cylinder after being mixed and stirred uniformly; injecting the material B into B material cylinder after being mixed and stirred uniformly; connecting pipeline A to the A material cylinder, connecting pipeline B to the B material cylinder, introducing the material A and the material B into a stirring chamber of a filling machine head at the same time from the two material cylinders using the pipeline A and the pipeline B under the action of a pressure pump, respectively, uniformly stirring the material for 0.2 s using a stirring blade rotating at a high speed in the stirring chamber, and then injecting the material rapidly into the cavity of the lower mold of the mold from the discharging port of the filling machine. In order to feed uniformly, the sole of the mold is raised by 6 cm prior to injecting the shoe material, and the shoe material is taken from the middle of the cavity of the lower mold of the mold when being injected, and is fed to the sole along the middle of the cavity of the lower mold of the mold until the top of the cavity of the mold; the amount of the injected shoe material accounts for ⅓ of the total volume of the mold cavity, and the injected shoe material is foamed in such a way to be filled into the whole cavity to form the insole; after finishing injecting shoe material, the mold is placed in an oven at a temperature of 78° C. for 5 minutes to emulsify and foam the shoe material, the upper mold of the mold is opened after finishing emulsifying and foaming, and the insole is taken out.

As a preferred embodiment, the material A comprises the following raw material in parts by weight: 70 kg of castor oil, 25 kg of polyethylene glycol ether, 1.3 kg of solid acid catalyst, 0.9 kg of tertiary amine catalyst, 0.04 kg of gel catalyst, 1.0 kg of foam stabilizer, 1.5 kg of vinyl silicone oil, 1.1 kg of ammonia catalyst and 0.5 kg of water; the material B comprises the following raw material in parts by weight: 70 kg of diphenylmethane diisocyanate, 23 kg of polyether, and 6 kg of diargonized carbon; and the weight ratio of the material A to the material B is 100:58.

Embodiment 4

A production process of an insole comprises the steps of:

(1) cleaning an insole mold; cleaning the flash on the edge of the mold with a scraper knife, and then blowing the foreign matter in the mold with a blower gun to prevent foreign matter in the mold from affecting the quality of the product;

(2) mixing and stirring the oily release agent and quick-drying water uniformly at a weight ratio of 22:100, then spraying the oily release agent at a distance of 20 cm from the mold by a spray gun into the cavity of the upper mold and the cavity of the lower mold of the mold, adjusting the spray gun into an atomizing shape when spraying the oily release agent, spraying along the shape of the cavity, spraying at every corner, forming an oily release agent having a thickness of 0.1 mm in the cavity after finishing spraying; wherein the oily release agent cannot be sprayed too thickly when being sprayed, and if the oily release agent is sprayed too thickly, the solvent is not volatile, and it is not easy for the release agent to dry, which will damage the product;

As a preferred embodiment, the oily release agent comprises the following raw material in parts by weight: 92 kg of silicone resin, 10 kg of polydimethylsiloxane, and 3 kg of phenyl alkyl sulfonate.

(3) uniformly fixing cloth in the cavity of the upper mold after the oily release agent is sprayed; putting the cloth with a corresponding yardage according to the yardage of the mold and hanging the cloth on the corresponding nail position on the mold from top to bottom, and checking whether the cloth is flat after hanging the cloth, wherein if the cloth is not flat, the cloth is adjusted, and since the cloth will wrinkle due to being not flat after the mold is clamped, which will affect the quality of the finished product, the flatness of the cloth should be ensured;

(4) injecting material A into A material cylinder after being mixed and stirred uniformly; injecting the material B into B material cylinder after being mixed and stirred uniformly; connecting pipeline A to the A material cylinder, connecting pipeline B to the B material cylinder, introducing the material A and the material B into a stirring chamber of a filling machine head at the same time from the two material cylinders using the pipeline A and the pipeline B under the action of a pressure pump, respectively, uniformly stirring the material for 0.3 s using a stirring blade rotating at a high speed in the stirring chamber, and then injecting the material rapidly into the cavity of the lower mold of the mold from the discharging port of the filling machine. In order to feed uniformly, the sole of the mold is raised by 8 cm prior to injecting the shoe material, and the shoe material is taken from the middle of the cavity of the lower mold of the mold when being injected, and is fed to the sole along the middle of the cavity of the lower mold of the mold until the top of the cavity of the mold; the amount of the injected shoe material accounts for ½ of the total volume of the mold cavity, and the injected shoe material is foamed in such a way to be filled into the whole cavity to form the insole; after finishing injecting shoe material, the mold is placed in an oven at a temperature of 80° C. for 6 minutes to emulsify and foam the shoe material, the upper mold of the mold is opened after finishing emulsifying and foaming, and the insole is taken out.

As a preferred embodiment, the material A comprises the following raw material in parts by weight: 72 kg of castor oil, 26 kg of polyethylene glycol ether, 1.6 kg of solid acid catalyst, 1.0 kg of tertiary amine catalyst, 0.05 kg of gel catalyst, 1.2 kg of foam stabilizer, 1.6 kg of vinyl silicone oil, 1.2 kg of ammonia catalyst and 0.6 kg of water; the material B comprises the following raw material in parts by weight: 72 kg of diphenylmethane diisocyanate, 26 kg of polyether, and 8 kg of diargonized carbon; and the weight ratio of the material A to the material B is 100:60.

The present invention is not limited to the above-described preferred embodiments, and other products of various forms can be derived by anyone in the light of the present invention, but the technical solutions which are the same or similar to the present application are all within the scope of protection of the present invention regardless of any change in their details.

What is claimed is:

1. A production process of an insole, comprising the steps of:
   (1) cleaning an insole mold;
   (2) spraying an oily release agent into a cavity of an upper mold and a cavity of a lower mold of the mold;
   (3) uniformly fixing cloth in the upper mold;
   (4) injecting shoe material into the cavity of the lower mold of the mold, covering the upper mold of the mold and locking the upper mold and the lower mold after finishing injecting shoe material, and then placing the mold in an oven for baking to emulsify and foam the shoe material, opening the upper mold of the mold after finishing foaming, and taking out the insole;
   wherein the shoe material comprises material A and material B;
   wherein the material A further comprises raw material in parts by weight: 68-72 parts of castor oil, 23-26 parts of polyethylene glycol ether, 1.2-1.6 parts of solid acid catalyst, 0.9-1.0 parts of tertiary amine catalyst, 0.03-0.05 parts of gel catalyst, 0.8-1.2 parts of foam stabilizer, 1.3-1.6 parts of vinyl silicone oil, 1-1.2 parts of ammonia catalyst and 0.4-0.6 parts of water; and
   wherein the material B further comprises the following raw material in parts by weight: 68-72 parts of diphenylmethane diisocyanate, 22-26 parts of polyether, and 4-8 parts of diargonized carbon.

2. The production process of an insole according to claim 1, wherein in the step (2), the oily release agent and quick-drying water are mixed and stirred uniformly and then are sprayed; the oily release agent and the quick-drying water have a weight ratio of 18-22:100.

3. The production process of an insole according to claim 1, wherein in the step (2), the oily release agent is sprayed at a distance of 15-20 cm from the mold by a spray gun so that the cavities of the upper mold and the lower mold are uniformly coated with the oily release agent having a thickness of 0.05-0.1 mm.

4. The production process of an insole according to claim 1, wherein in the step (4), a sole of the mold is raised by 4-8 cm, and the shoe material is injected into the cavity of the lower mold.

5. The production process of an insole according to claim 1, wherein in the step (4), the injected shoe material moves from the middle of the lower mold of the mold to fill up a sole along the middle of the cavity of the lower mold of the mold.

6. The production process of an insole according to claim 1, wherein in the step (4), the amount of the injected shoe material accounts for ⅓-½ of the total volume of the mold cavity.

7. The production process of an insole according to claim 1, wherein in the step (4), the mold is fed into an oven at a temperature of 75-80° C. for 5-6 minutes.

8. The production process of an insole according to claim 1, wherein the oily release agent comprises the following raw material in parts by weight: 88-92 parts of silicone resin, 6-10 parts of polydimethylsiloxane, and 1-3 parts of phenyl alkyl sulfonate.

9. The production process of an insole according to claim 1, wherein the weight ratio of the A material to the B material is 100:58-60.

* * * * *